United States Patent [19]
Gatellier et al.

[11] 3,953,308
[45] Apr. 27, 1976

[54] PROCESS AND APPARATUS FOR DESULFURIZING OF LIQUID METALS

[75] Inventors: Christian Gatellier, Metz; Michel Olette, Lessy, both of France

[73] Assignee: Institut de Recherches de la Siderurgie Francaise (IRSID), Saint-Germain-En-Laye, France

[22] Filed: Mar. 18, 1975

[21] Appl. No.: 559,597

[30] Foreign Application Priority Data
Mar. 27, 1974 France .............................. 74.10589

[52] U.S. Cl. ............................ 204/140; 204/243 R; 204/145 F
[51] Int. Cl.² .......................................... C25F 1/00
[58] Field of Search ............ 204/140, 141.5, 195 S, 204/243 R; 136/86 F, 153

[56] References Cited
UNITED STATES PATENTS

| | | |
|---|---|---|
| 3,400,054 | 9/1968 | Ruka et al. .............................. 204/1 |
| 3,650,934 | 3/1972 | Hickam et al. ................... 204/195 S |
| 3,726,772 | 4/1973 | Takahashi et al................... 204/140 |
| 3,843,400 | 10/1974 | Radford et al................... 204/195 S |
| 3,878,073 | 4/1975 | Boorstein et al..................... 204/140 |

*Primary Examiner*—T. M. Tufariello
*Attorney, Agent, or Firm*—Michael S. Striker

[57] ABSTRACT

A layer of electrolyte in pulverulent form is spread over the free surface of a liquid metal to be desulfurized, in which the layer provides cationic conductivity by means of a cation adapted to react with the sulfur contained in the metal. The electrolyte layer is contacted with a first electrode connected to the positive pole of a direct current supply and the metal is contacted by a second electrode connected to the negative pole of the current supply.

20 Claims, 3 Drawing Figures

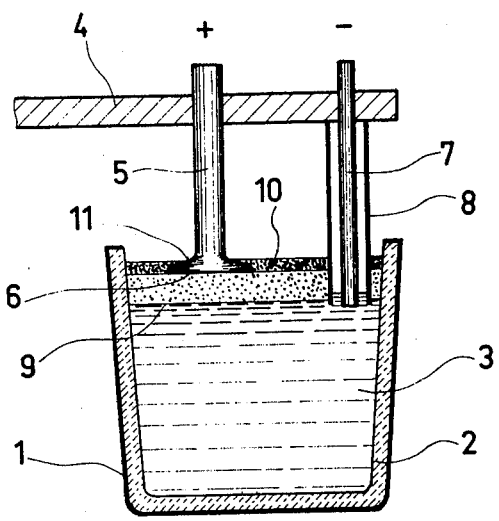
FIG_1_
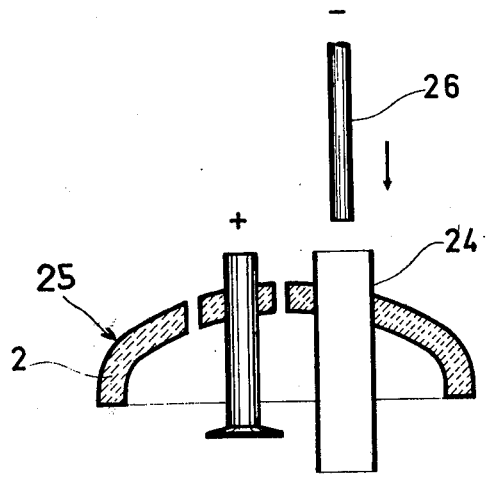
FIG_3_

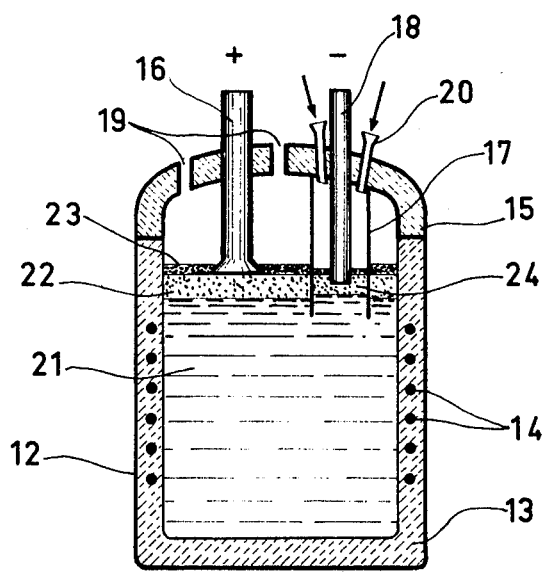
FIG_2_

PROCESS AND APPARATUS FOR DESULFURIZING OF LIQUID METALS

BACKGROUND OF THE INVENTION

The present invention relates to the desulfuration of liquid metals at an elevated temperature by means of a solid electrolyte traversed by a direct current.

During extensive research, the inventors have shown that it is possible to lower the sulfur content in a liquid metal, especially steel, by passing a direct current through a partition formed by a solid electrolyte in contact on both sides with the liquid metal in which the metal to be refined is connected to the negative pole of a direct current supply by means of an electrode. The wall of solid electrolyte is constituted by an oxide of alkaline metals or alkaline earth metals containing a halide of the mentioned metals, especially a halide of calcium and more specifically a fluoride or a chloride of this metal such to assure a good cationic conductivity of the electrolyte by an ion capable to react with the sulfur, for instance the cation $Ca^{++}$. The oxide constituting the partition wall is preferably lime or a mixture of lime and magnesia in proportions approximately equal to those of dolomite.

During passage of the direct current through the assembly, a transfer of cations through the wall is obtained and a reaction of the cation with the sulfur to result in sulfide which forms a layer adherent to the wall. After proceeding with the electrolysis for a certain time, the sulfur initially contained in the metal bath will be fixed to the wall.

This technique developed in the laboratory could, however, not be carried out on an industrial scale in which the metal to be treated is in the order of 10 tons or more of liquid steel.

SUMMARY OF THE INVENTION

It is an object of the present invention to provide a process and apparatus for carrying out the aforementioned method on an industrial scale.

With these and other objects in view, which will become apparent as the description proceeds, the present invention relates to a process of desulfurization of a liquid metal by means of a solid electrolyte and comprising the steps of introducing the liquid metal into a metallurgical vessel, which may be heated, to spread at least over a portion of the free surface of the metal a layer of solid electrolyte in pulverulent form constituted by an oxide of alkaline metals or alkaline earth metals, such as lime or a mixture of lime and magnesia, containing a halide of the alkaline metals or alkaline earth metals, such as a halide of calcium and especially calcium fluoride in such a manner to assure a cationic conductivity by means of a cation adapted to react with the sulfur, to contact the layer of electrolyte with a first electrode and the metal with a second electrode and connecting the electrodes to a source of direct current with the electrode contacting the metal connected to the negative pole of the direct current supply.

In accordance with the present invention, the lime and the magnesia are mixed in proportion substantially equal to that present in dolomite. According to a variation of the process, a layer of pulverulent material which is electrically conductive, but which will not chemically react with the metal, is spread over a portion of the free surface of the metal which is not covered by the electrolyte layer and the two layers are separated by an electrically insulating partition of refractory material and the two electrodes are respectively placed into contact with said two layers, and the electrodes are connected to the two poles of a direct current supply, with the negative pole of the current supply connected to the electrode which is in contact with the layer of electrically conductive but chemically not reacting layer.

In order to improve the electrical contact with the layers, the process may also include additionally a layer of graphite superimposed on at least on the electrolyte layer.

It is also an object of the present invention to provide an apparatus for carrying out the process, and comprising a metallurgical vessel, which may be heated, for receiving the metal to be desulfurized, a support for supporting at least one of the electrodes and means for separating a portion of the free surface of the liquid metal from the remainder of the free surface and forming a cationic compartment in which another electrode is introduced, which is connected to the negative pole of a direct current supply, whereas the first electrode is connected to the positive pole of such supply.

While the use of a vessel of large dimensions which represents an extrapolation of the work carried out in the laboratory is always possible, this will lead often to expensive apparatus which has not the necessary strength and simplicity for use in a plant.

Furthermore, it is desirable to carry out the desulfurization operation in metallurgical vessels or crucibles which are already available.

The technique used according to the present invention in which a layer of pulverulent electrolyte is substituted for a rigid wall of solid electrolyte permits to carry out the method according to the present invention in many different ways and to carry out the desulfurization in metallurgical apparatus especially conceived for this purpose or in already existing apparatus, such as in crucibles of induction furnaces, arc furnaces, etc.

It will be evident that it is possible without difficulties to spread onto the free surface of a liquid metal a layer of electrolyte in pulverulent form and to subsequently apply electrodes to the layer of electrolyte and the metal, regardless of the form of the vessel in which the liquid metal is contained. It is only important that during such treatment the temperature of the metal will remain sufficiently high, in the order of 1600° C to assure a sufficient conductivity of the solid electrolyte.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a cross section through an apparatus for carrying out the method according to the present invention in which the metal is contained in a crucible;

FIG. 2 is a cross section similar to FIG. 1 and showing a different apparatus in which the vessel in which the liquid metal is contained is constituted by an induction furnace; and FIG. 3 is a partial cross section through a modification of the apparatus shown in FIG. 2.

DESCRIPTION OF THE PREFERRED EMBODIMENTS

To desulfurize a predetermined amount of liquid metal, for instance steel, the latter has to be introduced first into a metallurgical vessel or crucible which preferably comprises an outer steel armor lined at the inner surface by a layer of refractory material which will withstand the elevated temperature of the molten metal. According to the duration of the operation and the thermal insulation conditions, the vessel may or may not be equipped with heating means. For example, in FIG. 1 a simple crucible is illustrated, whereas in FIG. 3 an induction furnace is illustrated which permits to add calories to the metal to compensate for thermal losses.

After the liquid metal is introduced into the vessel, a layer of solid electrolyte in pulverulent form is spread over part of the free surface of the metal to obtain a layer of uniform thickness of a few centimeters. Subsequently thereto, the outer surface of the electrlyte layer is contacted with an electrically conductive electrode having a rather large contact surface to facilitate passage of current from the electrode to the layer of electrolyte. In order to improve the electrical contact, it is also possible to place a layer of carbon powder onto the surface of the electrolyte contacted by the electrode to thus embed the contacting end of the electrode in the layer of carbon powder. In order to assure passage of current through the electrolyte and the liquid metal a second electrode has to be introduced into the metal. The contact between the second electrode and the metal may be carried out in known manner by means of a cooled metallic electrode introduced through the bottom wall or the peripheral wall of the vessel.

This solution requires, however, use of a special metallurgical vessel to carry out the desulfurization process. Another way to proceed consists to carry the current to the free surface of the metal by means of a descending electrode. In this case, it is important to reserve on the free surface of the metal a portion which is free of the electrolyte in order to be able to immerse an electrode, either metallic and cooled, or of graphite into this portion of the metal. The electrodes are then connected to a source of direct current and the electrode contacting the metal is connected to the negative pole of the current supply. The intensity and time of treatment will be determined, on the one hand, as a function of the sulfur content in the vessel and the mass of metal, and on the other hand, as a function of the final sulfur content which will remain in the metal.

The electrolyte used in the present application is generally lime containing a percentage in the order of 4 to 5% of calcium fluoride. It is possible to use different formulas, for example magnesia containing a fluoride of calcium, or an oxide, or a mixture of oxides of alkaline metals or alkaline earth metals containing a halide of these metals. The practically preferred electrolyte is constituted by lime or dolomite containing a fluoride of alkaline metals or alkaline earth metals. It should, however, be noted that lime containing lithium fluoride has only a very small influence on the sulfur contained in the liquid metal and in general tests carried out have proven that calcium fluoride is the most advantageous material to obtain a very small residual amount of sulfur in the liquid metal.

As mentioned, a transfer of ions $Ca^{++}$ or ions adapted to react with the sulfur and starting from the electrolyte toward the surface of the liquid metal will be carried out by the current, and these ions will react with the sulfur contained in the liquid metal to form a sulfide, especially calcium sulfide. One of the advantages of the method according to the present invention is that the composition formed is stable so that after interruption of the current no reintroduction of sulfur to the metal will occur. It is therefore possible to stop the current supply, to withdraw the electrodes and to proceed without risk with the evacuation of the electrolyte layer to which the sulfide of calcium is attached.

Referring now to the drawing and more specifically to FIG. 1 of the same, in which one embodiment of the apparatus of the present invention is illustrated, it will be seen that this apparatus comprises a crucible of known construction in which the desulfurization is carried out. This crucible comprises an outer armor of steel 1, which is covered at the inside thereof with a lining of refractory material 2. The liquid metal 3 to be desulfurized is introduced in a predetermined quantity into the vessel or crucible and subsequently thereto a support 4 is extended over the crucible. A first graphite electrode 5 is fixedly supported on the support 4 and projecting downwardly therefrom and having at its lower end an enlarged contact portion 11. The support 4 further supports a second electrode 7 having a lower end projecting downwardly beyond the lower end of the electrode 5 and being surrounded by a sleeve 8 of electrically insulating refractory material, which is likewise fixed to the support. The support 4 is then lowered, by any means known in the art and not forming part of the present invention, so that the lower end of the electrode 7 and the sleeve 8 surrounding the same will slightly dip into the liquid metal. Thus it will be seen that the graphite electrode 5 will be located with its lower end above the upper level of the metal bath in the crucible and that there exists a free space between the bottom face 6 contact portion 11 of the electrode 5 and the surface of the liquid metal.

Subsequently thereto, a solid electrolyte in pulverulent form is spread over the free surface of the liquid metal around the sleeve 8 to thus form a layer 9 of electrolyte of a thickness of several centimeters, generally in the order of 10 cm. To improve the electrical contact between the thus formed layer of the electrolyte and the bottom face 6 of the electrode 5 a thin layer of graphite 10 is preferably spread over the electrolyte layer in such a manner as to cover the lower end portion 11 of the electrolyte 5 with graphite. The electrodes are then connected to the two poles of a direct current supply, not illustrated, with the electrode 5 connected to the positive pole and the electrode 7 to the negative pole of such supply.

FIG. 2 illustrates a modified apparatus for carrying out the process, in which the process is carried out in an induction furnace by means of which it is possible to control the temperature of the liquid metal introduced therein. The furnace, which is only schematically illustrated, likewise includes, as the embodiment shown in FIG. 1, an outer steel armor 12 provided at its inner surface with a lining 13 of refractory material in which coils 14 of an inductor are embedded. The furnace is equipped with a cover 15 to limit thermal losses. The cover 15 serves to support an electrode 16 similar to the electrode 5 shown in FIG. 1 and a sleeve 17 made of electrically insulating material, as well as a second electrode 18, likewise of graphite and arranged coaxially with the sleeve 17. The cover is provided with a plurality of apertures 19 and further with a plurality of pipes 20 having outer funnel-shaped ends and inner ends located within the interior of the sleeve 17. In carrying out the desulfurization operation, the cover with the elements attached thereto is first removed, and mass of liquid metal 21 is introduced in the furnace and subsequently thereto the cover 15 is placed on the upper end thereof. It will be noted that when the cover 15 is thus placed on the upper end of the furnace, the electrode 18 is not in contact with the upper metal surface. The electrolyte in pulverulent form is then introduced through the apertures 19 into the furnace to form a layer 22 of a few centimeters on the upper surface of the metal around the outer surface of the sleeve 17. Subsequently thereto, a current conductive powder 24, which will not chemically react with the metal, is introduced through the pipes 20 into the interior of the sleeve 17 until it makes contact with the graphite electrode 18, preferably until the lower end of the electrode dips into this powder layer.

As in the above-described embodiment illustrated in FIG. 1, the electrodes are then connected to a pole of a direct current supply with the electrode 16 connected to the positive and the electrode 18 connected to the negative pole. It is evident that more than two electrodes and corresponding sleeves may be used in the arrangement as shown in FIG. 2.

A slight modification of the arrangement shown in FIG. 2 is shown in FIG. 3 in which the sleeve 24 extends through an opening in the cover 25 and wherein the electrode 26 is not fixed to the cover. In this modification, the conductive powder is introduced through the sleeve 24 before the electrode 26 is placed into the interior of the sleeve. The electrode 26 may be lowered through the sleeve 24 and held subsequently thereto in a fixed position by support means not illustrated and being of a known standard construction.

It is further pointed out that the electrodes may be arranged in any known manner movable relative to the support in axial direction of the electrode in order to adjust the position of the lower electrode ends with respect to each other and with respect to the material introduced into the crucible.

It is also pointed out that instead of the vessels respectively shown in FIGS. 1 and 2 also different kinds of vessels or furnaces may be used to carry out the method according to the present invention, for instance it may be carried out in a channel-shaped induction furnace or in an electric arc furnace.

By way of example, it is mentioned that the method of the present invention was carried out with steel with an initial sulfur content of 0.015% and in which a direct current of 2500 amps per ton of steel was used to obtain by the end of 10 minutes a residual sulfur content of 0.005%.

It is understood that with the method of the present invention it is not only possible to desulfurize steel, but also other liquid metals may be desulfurized provided the temperature is maintained sufficiently high to assure the conductivity of the solid electrolyte.

It will be understood that each of the elements described above, or two or more together, may also find a useful application in other types of process and apparatus for desulfurization of liquid metals differing from the types described above.

While the invention has been illustrated and described as embodied in a process and apparatus for desulfurization of liquid metals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process of desulfurization of liquid metal comprising the steps of introducing the liquid metal into a metallurgical vessel; spreading over part of the free surface of the liquid metal a layer of solid electrolyte in pulverulent form and providing cationic conductivity by means of a cation adapted to react with the sulfur content in the liquid metal; contacting the electrolyte layer with a first electrically conductive electrode; contacting the liquid metal with a second electrically conductive electrode; and connecting said electrodes to an electric circuit to pass a direct current through the electrolyte, the electrode contacting the metal being connected as cathode in the circuit.

2. A process as defined in claim 1, and including the step of heating the vessel.

3. A process as defined in claim 1, wherein the electrolyte is constituted by material taken from the group consisting of alkaline metal oxides, alkaline earth metals, containing a halide of alkaline metals or alkaline earth metals.

4. A process as defined in claim 1, and including the steps of dividing the free surface of the liquid metal into two portions by means of a partition of refractory electrically insulating material, spreading over one of said dividing surface portions said electrolyte, and contacting the electrolyte with said first electrode, and introducing into the metal at the other of the divided surface portions the second electrode.

5. A process as defined in claim 1, and including the steps of dividing the free surface of the liquid metal into two portions by means of a partition of refractory electrically insulating material, spreading over one of the divided surface portions an electrolyte, contacting the electrolyte with said first electrode, spreading over the other of said divided surface portions a layer of electrically conductive but not chemically reacting metal pulverulent material, and contacting the last-mentioned layer with said second electrode.

6. A method as defined in claim 1, and including the step of spreading at least over the electrolyte layer a layer of granulated electrically conductive material to improve the contact of said first electrode with said layer of electrolyte.

7. A process as defined in claim 6, wherein said layer of electrically conductive material is formed from graphite powder.

8. A process as defined in claim 3, wherein the oxide constituting the electrolyte is lime.

9. A process as defined in claim 3, wherein the oxide constituting the electrolyte is magnesia.

10. A process as defined in claim 3, wherein the oxide constituting the electrolyte is a mixture of lime and magnesia.

11. A process as defined in claim 10, wherein the quantitative composition of said mixture corresponds substantially to the composition of dolomite.

12. A process as defined in claim 3, wherein said halide of alkaline metal or alkaline earth metal is a calcium halide.

13. A process as defined in claim 12, wherein said calcium halide is a calcium fluoride.

14. A process as defined in claim 12, wherein the percentage of said calcium halide in the electrolyte is in the order of 4–5% of weight.

15. A process as defined in claim 1, and including the step of heating the liquid metal and the layer of electrolyte to maintain the liquid metal and the electrolyte at a temperature of about 1600° C.

16. Apparatus for desulfurizing liquid metal with a layer of solid particulated electrolyte applied onto at least part of the free surface of the liquid metal, said apparatus comprising a crucible adapted to contain the metal to be desulfurized and the layer of electrolyte; a support above said crucible; at least one electrode and means to form a cathodic compartment separating a portion of the free surface of a liquid metal in the crucible from the remainder of the free surface; and a second electrode extending through said means and arranged to be in electrical contact with the liquid metal, said second electrode being connected to the negative pole and the one electrode to the positive pole of a supply of direct current.

17. An apparatus as defined in claim 16, and including heating means for heating the crucible.

18. Apparatus as defined in claim 17, wherein said crucible comprises an outer metallic armor and a lining of refractory material, said heating means comprising an induction coil embedded in said lining.

19. Apparatus as defined in claim 16, wherein said crucible has an upper open end wherein said support comprises a cover substantially closing said open end.

20. Apparatus as defined in claim 19, wherein said means for forming a cathodic compartment comprises a sleeve of electrically insulating material fixed to and projecting downwardly from said cover, said second electrode being fixed to said cover coaxial with said sleeve, and including means extending through said cover into said sleeve for introducing a pulverulent, electrically conductive material, which is chemically not reacting with the liquid metal, onto the free surface of the metal within said sleeve, said second electrode being arranged to contact the pulverulent electrically conductive material introduced into said sleeve.

* * * * *